United States Patent
Kshirsagar et al.

(10) Patent No.: US 12,111,827 B2
(45) Date of Patent: Oct. 8, 2024

(54) SIGNALS AND MEASUREMENT OF BUSINESS GOALS IN A CHATBOT PLATFORM

(71) Applicant: Salesforce, Inc., San Francisco, CA (US)

(72) Inventors: Atul Kshirsagar, San Ramon, CA (US); Mark Holton, Alpharetta, GA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 17/932,750

(22) Filed: Sep. 16, 2022

(65) Prior Publication Data

US 2024/0095240 A1    Mar. 21, 2024

(51) Int. Cl.
   *G06F 16/00*    (2019.01)
   *G06F 16/242*    (2019.01)
   *G06F 16/2452*    (2019.01)

(52) U.S. Cl.
   CPC ...... *G06F 16/24522* (2019.01); *G06F 16/243* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — Debbie M Le
(74) *Attorney, Agent, or Firm* — Lorenz & Kopf, LLP

(57) ABSTRACT

A method for reporting a success of a dialog session including generating an outcome data indicative of a positive outcome of the dialog session with at least one of the plurality of natural language responses, receiving a natural language query, converting the natural language query into a structured database query based on the metadata, performing the structured database query on a database, generating a result in response to a response data received in response to the structured database query, generating a natural language responses in response to the result and the plurality of natural language response data, sending, by the chatbot, the natural language response, generating a result metadata in response to a comparison of the result to the outcome data, and generating an outcome log in response to the result metadata wherein the outcome log includes an indication of the positive outcome of the dialog session.

19 Claims, 4 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,410,107 B2 * | 9/2019 | Romero ............... G06F 21/32 |
| 11,064,074 B2 * | 7/2021 | Erhart ............... H04L 51/02 |
| 11,295,194 B2 * | 4/2022 | Romero ............... G06F 21/31 |
| 11,457,496 B2 * | 9/2022 | Bai ............... H04B 7/0617 |
| 11,637,792 B2 * | 4/2023 | John ............... H04L 67/51 704/9 |
| 11,651,158 B2 * | 5/2023 | Yang ............... G06N 3/04 704/270.1 |
| 11,991,126 B2 * | 5/2024 | Sharma ............... H04L 65/1069 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2021/0350073 A1 * | 11/2021 | Trehan ............... G06F 16/9035 |
| 2022/0076283 A1 * | 3/2022 | Oliveira ............... H04L 51/216 |
| 2023/0188482 A1 * | 6/2023 | Willis ............... H04L 51/56 709/206 |

* cited by examiner

SIGNALS AND MEASUREMENT OF BUSINESS GOALS IN A CHATBOT PLATFORM

TECHNICAL FIELD

Embodiments of the subject matter described herein relate generally to chatbot dialog system and algorithms. More particularly, embodiments of the subject matter relate to a method and apparatus for implementing a chatbot configuration system to enable an administrator to define a chatbot session goal and to provide notification when the goal is achieved.

BACKGROUND

People are turning more and more to the internet to get information related to a company's products and services. In turn, companies are providing more and more information online regarding their products and services, often foregoing printed information altogether. This may make finding information regarding a particular aspect of a product or service difficult for a user to locate online. To address this problem, Chatbots are being employed to quickly answer user questions and to quickly direct a user to their desired information. A Chatbot is a program which can simulate a human conversation by receiving natural language input and provide responses in a natural language format. Chatbots pose questions to a user and receive user input in a conversational, natural language format. The Chatbot program then converts the natural language input received from the user to a set of key words used to determine an input intent and to formulate a response. The programs behind the Chatbot can analyze a user input to provide the requested information, direct a user to an appropriate web location, or to initiate a more focused Chatbot session related to the user requirements.

Chatbot sessions are often provided as website popups or entry fields on a webpage and may be implemented using a combination of one or more of rules, keywords analysis, and artificial intelligence. Chatbot sessions are typically designed to address a particular user requirement with new Chatbot sessions initiated in a continuous fashion in response to a user input. For example, an initial Chatbot session may ask a user "How may we help you?" In response, the user may enter "open new account" and the Chatbot may complete the initial Chatbot session and open a new chatbot session related to opening new accounts. This change in session may not be obvious to the user. Single Chatbot sessions with overly complex use cases may be unreliable and may be frustrating to a user.

Chatbot administrators can configure natural language processing elements associated with logical elements such as dialogs and rules to pose user questions and provide appropriate answers to Chatbot session users. However, it can be difficult for an administrator to determine the success of a Chatbot session because the system is so open ended. A user may drop out of a Chatbot session for any number of reasons, such as frustration, distraction, finding the desired information or initiating a new search in response to information provided during the Chatbot session. In order for an administrator to design efficient and effective Chatbot sessions, it is desirable to determine if users are reaching their end goal and if the Chatbot session has been successful. Accordingly, it is desirable to develop a system for providing high-level feedback related to user Chatbot sessions in order to isolate if the intention or goal of the chatbot is being attained. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
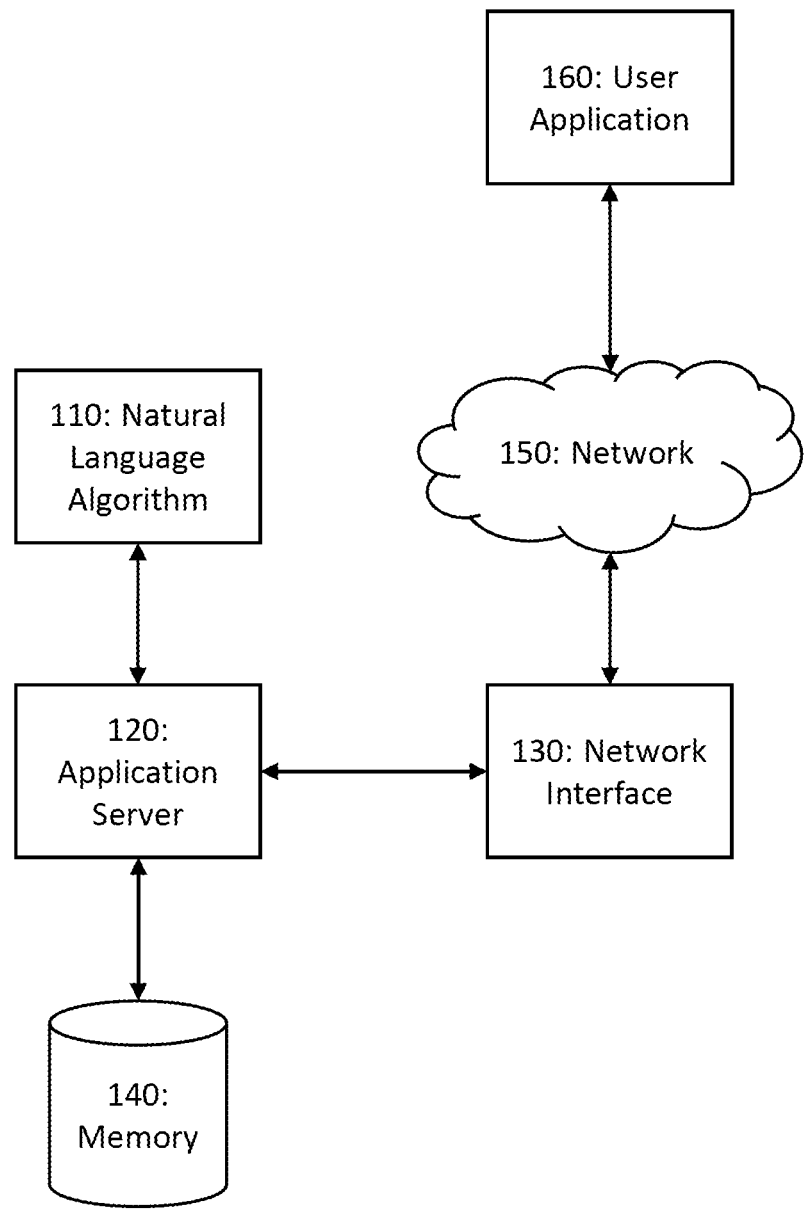
FIG. 1 shows an exemplary system for signals and measurement of business goals in a chatbot platform according to an exemplary embodiment of the present disclosure.

Turning now to FIG. 1, an exemplary system 100 for signals and measurement of business goals in a chatbot platform according to an exemplary embodiment of the present disclosure is shown. The exemplary system 100 shows a complex system a natural language algorithm 110, an application server 120, a network interface 130 and a memory 140. The network interface 130 can be communicatively coupled to a communications network 150, such as a local area network, wireless local area network, or the internet. In some exemplary embodiments, the scale of the system 100 may vary and may include fewer or additional components that those described here. In some exemplary embodiments, the system 100 may occur remotely where components are distributed across one or more devices of a distributed network. Chatbots can leverage a plurality of resources, including internal and external natural language processors, machine learning, analytics services, and third party services to generate a response to user communications and take actions on behalf of the user. The use of the natural language processing and other additional information allows the application server 120 to generate an appropriate response to user natural language queries received at the user application 160.

The exemplary user application 160 may be performed on a user device, such as a computer with web browser, mobile device or the like. The user may initiate a Chatbot session in response to a user input transmitted from the user application 160 to the network interface 130 via the network 150. The application server 120 may perform the Chatbot session in response to the initiation form the user application 160. For example, the user may request a webpage. A timer is initiated after transmission of the webpage. If no further user action is received, the Chatbot session may be initiated by the application server 120. The Chatbot session may first include transmitting an initial question for presentation to the user within a Chatbot window. Alternatively, the user may click on a Chatbot session initiation button on within the user application 160. Metadata associated with a current state of the user application 160, user information and/or user application history may be transmitted with the Chatbot session initiation request in order to further refine the Chatbot session to the user requirements.

The application server 120 running the Chatbot session may receive a natural language text input from the user via the user application 160. The application server 120 must next interpret the natural language text input to generate data that can be used by the Chatbot program to generate accurate Chatbot responses. The application server 120 can first preprocess the natural language text to remove common words, segment or tokenize the received text, and tag the parts of speech in the natural language text, such as nouns, verbs and adjectives.

After preprocessing, the application server 120 may next use a natural language processing algorithm to process the natural language text input. The application server may employ a rules based algorithm or a machine learning based algorithm. A rules based system uses administrator designed rules to interpret the preprocessed natural language input. A machine learning based algorithms uses statistical methods generated in response to training data to generate the response. These machine learning based algorithms may be further trained on future user inputs, thereby refining the algorithm accuracy. Finally, the natural language processing algorithm returns inquiry data to the application server 120 useful for searching a response database and generating an appropriate user response in the Chatbot session.

Individual Chatbot sessions are often configured to meet a specific user requirement. An administrator of the Chatbot session can predetermine responses to be sent in response to outputs from the inquiry data from the natural language processing algorithm. For example, if a request is received from a user with a particular determined intent, an appropriate answer may be returned to the user or a follow up question may be posed to the user to further refine the user request. In addition, the administrator can determine a Chatbot session goal for a particular Chatbot session and configure the Chatbot session to collect metadata related to the user experience, the dialog session and/or generate a notification of the successful dialog outcome. For example, a Chatbot session may be configured to guide a user in fetching an order status for customers wanting a status updated on their order. The Chatbot session can be configured with an order status lookup dialog and set of elements, including one which returned results of order status. A goal could be set up for "Successfully Retrieved Order Status". This goal could be configured to be emitted during any Chatbot session where an order lookup dialog invoked the order lookup status and returned results. In this case, the Goal Achieved event would be configured by the admin to be emitted at the spot where the order status was fetched with results successfully fetched.

A current issue with collecting Chatbot session results information is either inferring a result from a particular set of Chatbot sessions or providing a user survey at the end of the session. Participation in these surveys is typically minimal and sufficient data points are not obtained and/or the data quality is not good enough to do any meaningful analysis. In the currently proposed configuration, the Chatbot administrator can be provided with a set of configuration and real-time tools to provide Chatbot session results concerning business goal success or failure of the configured Chatbot. Advantageously, this goal achieved related feedback can allow administrators to tune a Chatbot dialog algorithm for business goals based on the result, thereby iterating towards an increasingly more effective Chatbot. In addition, the Chatbot administrator may configure the Chatbot session to provide a goal achieved notification, with or without metadata, at any predefined spot in the Chatbot session. By giving the Chatbot administrator The ability to configure the event to be emitted at any time in the flow of a conversation allows the Chatbot administrator precise control over when a given session has achieved that particular functional or business goal without the need for an end-user to take any action. The goal achieved can be implicitly recorded when the dialog execution reaches the configured step in the dialog flow.

The goal achieved notification can be emitted and stored in such a way that connects that event to the chatbot session and other relevant metadata. This can include containers within the Chatbot configuration, such as dialogs or elements, indicative of where in the Chatbot session the notification was emitted. The container may further include other metadata such as the ChannelType in use in the session or the language being used. This metadata attached to the event can allow information to be inferred related to the effectiveness of a particular Chatbot configuration to achieve a goal versus various factors. The stored notification and related metadata supports the administrator to understand the context in which a goal is achieved vs not achieved.

The mechanism for emitting the success notification may include an HTTP post of an event to a database, publishing the event to a pub-sub channel, or the like, such that the event is emitted only when the business goal was reached in a given Chatbot session. For example, the execution engine of the Chatbot application, upon encountering the configuration for a Goal Achieved event, can publish a formatted event with metadata into a Pub Sub channel, such as a Kafka topic. These events can be detected downstream and stored in a datastore alongside the metadata in the event for analysis later. The attached metadata to each goal can be used to provide context to the administrator in order to enhance feedback for the Chatbot's performance. These goal success notifications can be collected, measured, aggregated, and analyzed as feedback for continual performance by the Chatbot session against the business goals, even in potentially an automated fashion.

Figure 2:
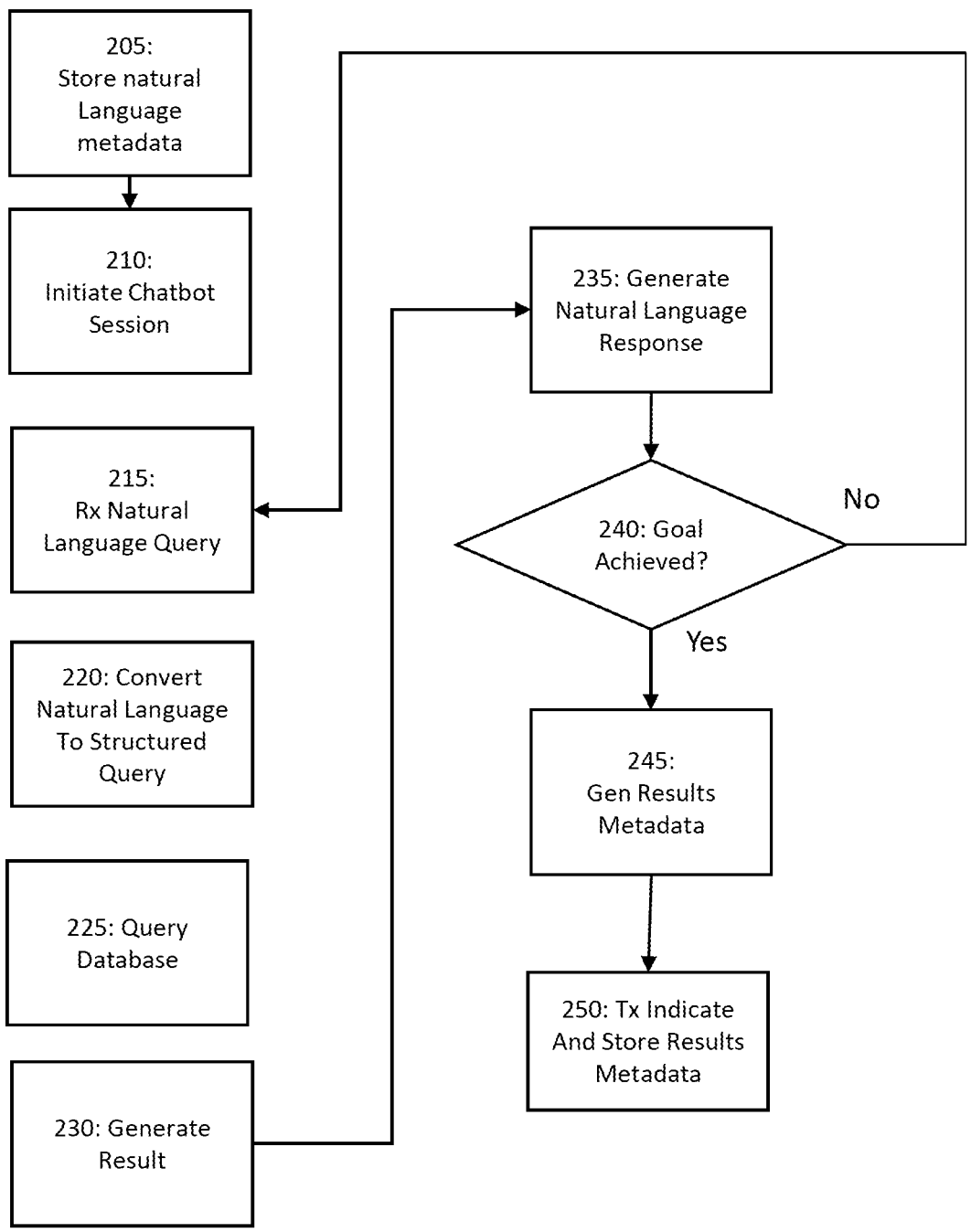
FIG. 2 is a flowchart of a method for generation of signals and measurement of business goals in a chatbot platform according to an exemplary embodiment of the present disclosure.

Turning now to FIG. 2, a flowchart 200 of a method for generation of signals and measurement of business goals in a chatbot platform according to an exemplary embodiment of the present disclosure is shown. The exemplary method may be performed by a processor or the like coupled to a non-transitory computer readable medium having computer instructions stored therein that when executed by a computer system cause the computer system to perform operations. The processor may be coupled to a network interface and a memory wherein the memory is employed to store a ruleset data and the generated metadata, such as outcome data or outcome logs. The memory may be one or more memory devices such that the ruleset data, natural language conversion data and algorithms and the generated metadata are stored on separate memory devices.

The method is first configured for generating 205 and storing metadata associating natural language sentence structures with structured data including an outcome data indicative of a positive outcome of the dialog session. The stored metadata and associated rules and algorithms facilitates conversion between a natural language statement and data that can be used for querying a response database. In some exemplary embodiments, generating the metadata includes training a machine learning based algorithm. Alternatively, the metadata may be a set of linguistic rules used to correlate a natural language query to a set of keywords related to the user intent. The metadata may be stored in a memory communicatively coupled to a natural language processor or a processor configured to perform a natural language processing algorithm.

The method is next configured to initiate 210 a chatbot session. The chatbot session may be performed by an application server communicatively coupled to a communications network, such as a local area network and/or the internet. The chatbot session may be initiated in response to a user request, to an algorithm or timer performed in combination with a user application, or in response to a request by another algorithm or chatbot session.

During the chatbot session, the application server can receive 215 a natural language query from a user. The natural language query may be generated by a user at a user interface and received at a network interface via a communications network, such as a local area network and/or the internet. In some exemplary embodiments, the natural language query may be in the form of a sentence or an unstructured combination of words.

The method next converts 220 the natural language query into a structured database query based on the metadata. The conversion may be performed by a natural language processing algorithm using a ruleset or machine learning algorithm. The natural language processing algorithm is configured to return a structured database query in response to the natural language query. The natural processing algorithm may be performed by a natural language processor, a natural language processing service provider, or an external service or database.

The method next queries 225 a database of Chatbot session response data using the structured database query. The Chatbot session response data may include instructions and information for responding to the specific database query. In some exemplary embodiments, in order to generate a Chatbot response, the Chatbot application server may further make external calls to external services, such as Apex or Flow, and the response can be constructed by combining the data obtained from database lookup with the results returned by the external calls. In general, the Chatbot session response data will be indicative of the user desired information.

The Chatbot application server next generates 230 a result in response to a response data received in response to the structured database query. The result may include follow up questions, customer instructions, weblinks, specific customer data, and other data used to provide the user with their desired information. For example, if a user inquiry indicates a question about a payment due date, the Chatbot session processor may determine the type of desired information in response to the Chatbot session response data and retrieve the determined desired information from a customer record associated with the user.

The method may next generate 235 a natural language response in response to the result. A natural language processor may be used to generate the natural language response using the result data. Alternatively, predetermined natural language response generated by a system administrator may be identified in response the result data and provided to the user as a natural language response. In some exemplary embodiments, the predetermined natural language response may include variable fields, such as "account balance" where one or more customer or query specific data items are retrieved and inserted into the predetermined natural language response. The natural language response is next transmitted via the network interface and communications network to the user interface for presentation to the user.

The method may further determine 240 from the Chatbot session response data if the provided response is an administrator defined "goal achieved" response. In the previous example, providing a user with a payment due date may be designated by a Chatbot administrator as a goal achieving response to an account inquiry. In some exemplary Chatbot sessions, the administrator may designate more than one response as a goal achieving response. For example, in an account inquiry Chatbot session, providing an account balance, an account status, an payment due date or a minimum payment amount may all be designated by a Chatbot administrator as goal achieved responses.

In some exemplary embodiments, a confirmation test of the goal achieved determination by transmitting a follow up question or observing a user response. For example, if the user closes or disconnects from the Chatbot session after receiving the administrator designated goal achieved response, the Chatbot session processor may confirm that the desired information was received. Likewise, a follow-up question can be transmitted to the user interface such as "Is there anything else we can do for you?" If a negative response is received back from the user via the user interface, the Chatbot session processor may confirm that the desired information was provided.

The method is next configured to generate 245 a result metadata in response to a result data and the goal achieved determination. The result metadata may include an indicator of the goal achieved event and may include metadata related to the user, the structured database query and results. In addition the metadata may include performance data related to the Chatbot session, such as number of user inputs and Chatbot responses, questions posed by the Chatbot session resulting in a user response leading to the goal achieved response, or other metrics or analytics related to the Chatbot session. Finally, the method next can transmit 250 a goal achieved indicator to a system administrator or other system monitoring application or data collection algorithm, and/or may save the result metadata in an outcome log or the like.

Figure 3:
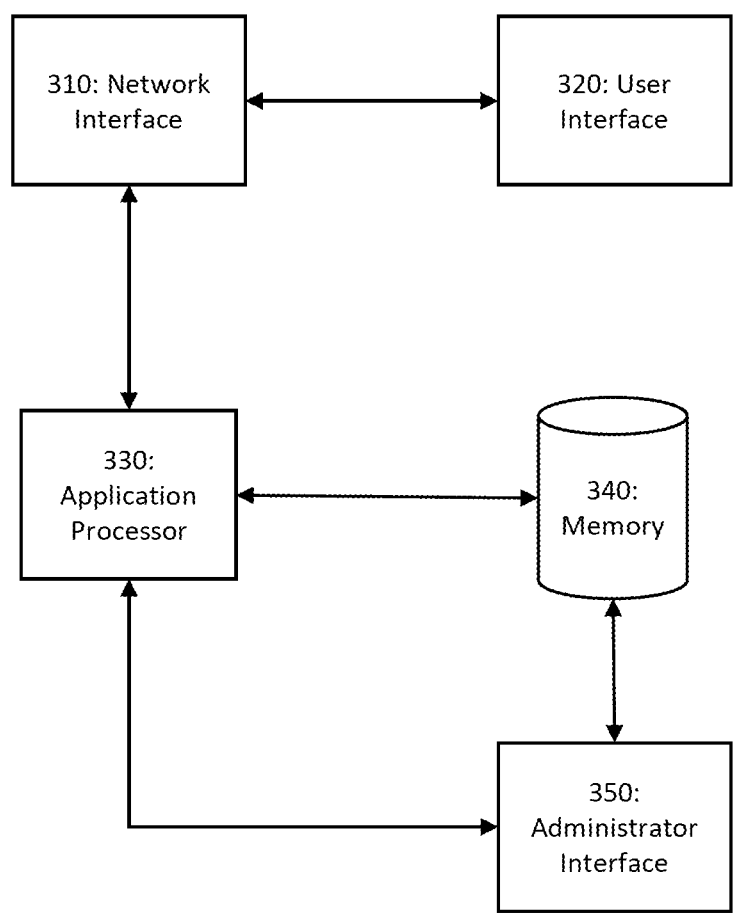
FIG. 3 is a block diagram of an exemplary system for signals and measurement of business goals in a chatbot platform according to an exemplary embodiment of the present disclosure.

Turning now to FIG. 3, a system 300 for performing a dialog session algorithm and for generating an outcome log in response to a dialog session outcome according to an exemplary embodiment of the present disclosure is shown. The exemplary system 300 can include a network interface 310, a user interface 320, an application processor 330, a memory 340 and an administrator interface 350.

The user interface 320 can be configured to execute a user application to receive and provide information to a user. In some exemplary embodiments, the user application may be a chatbot or dialog session for performing a customer relationship management application. The user interface 320 may be a smartphone, a personal computer, or other user electronic device. In some exemplary embodiments, a display on the user interface can display a chatbot session window wherein the chatbot session window displays natural language queries and responses generated by the chatbot session algorithm performed on the application processor 330 and may receive user responses and queries in response to user inputs. The various queries and responses can be transmitted between the user interface 320 and a network interface 310 via a communications network, such as the internet. The network interface 310 is configured to transmit and receive data from a communications network, to transmit and receive data from system sources, such as an application processor 330 and to decode and encode the received data into an appropriate format for further processing.

An administrator interface 350 may be used to configured a chatbot session by a chatbot session administrator. Via the administrator interface 350, the chatbot administrator may generate dialog session parameters, natural language response and queries, data associated with those natural language response and queries, dialog session flow and the like. In addition, the administrator may identify a point in the dialog session flow, an associated response or combination thereof as a goal achievement for the dialog session. The goal achievement may be associated with a business goal to be achieved during the dialog session. Examples of business goals may include providing a customer with a product recommendation, a requested account information, or a weblink to information related to a customer query. For example, a user may wish to know how to use loyalty points and a weblink is provided to a FAQ about loyalty points. Providing this weblink may be designated as a successful dialog session. In some exemplary embodiments, the administrator can generate and store a plurality of natural language responses associated with a dialog session flow and associate an outcome data indicative of a positive outcome of the dialog session with at least one of the plurality of natural language responses.

In response to determining a goal achieved for a successful dialog session, the administrator may further define a reporting scheme for recording successful completions of dialog sessions. Reporting schemes may include generating an output log. The output log may record each successful dialog session completion as well as metadata associated with the dialog session, the user, data provided, and/or the business goal achieved. The administrator may define this information, as well as other dialog flow information, via the administrator interface 350. The system may store this administrator generated information in a memory 340 accessible to the administrator interface 350 and the application processor 330. In addition, the administrator interface 350 can be communicatively coupled to the application processor 330 as well as the memory 340 to allow the administrator to configure or reconfigure the dialog session algorithm, responses, queries, results data, and the like.

The application processor 320 can be configured for performing the chatbot session algorithm in response to information provided by the chatbot session administrator via the administrator interface 350, data stored in the memory 340, and information received from the user via the user interface 320. In addition, the application processor 330 may perform a natural language to structured language conversion algorithm to enable natural language queries received via the user interface 320 to be used by the application processor 330 to search databases, retrieve desired information, and to generate natural language responses to provide to the user via the user interface 320.

The application processor 330 may form part of an application server and can be configured to perform the dialog session algorithm. This can include receiving a natural language query, wherein the natural language query is generated in response to a user input in a dialog session, generating a structured database query in response to the natural language query, and generating a results metadata in response to performing the structured database query. The application processor 330 may next generate a natural language response from the memory in response to the results metadata. Alternatively, the application processor 330 may select one of a plurality of stored natural language responses stored in the memory 340. The application processor 330 may next couple the natural language response to the network interface 310 for transmission to the user interface 320.

In addition, the application processor 330 can generate or append an outcome log in response to the result metadata wherein the outcome log includes an indication of the positive outcome of the dialog session in response to the one of the plurality of natural language responses being associated with the positive outcome of the dialog session. In some exemplary embodiments, the outcome log ma include at least one of a subset of the results metadata, a user information and a dialog session performance metric.

Figure 4:
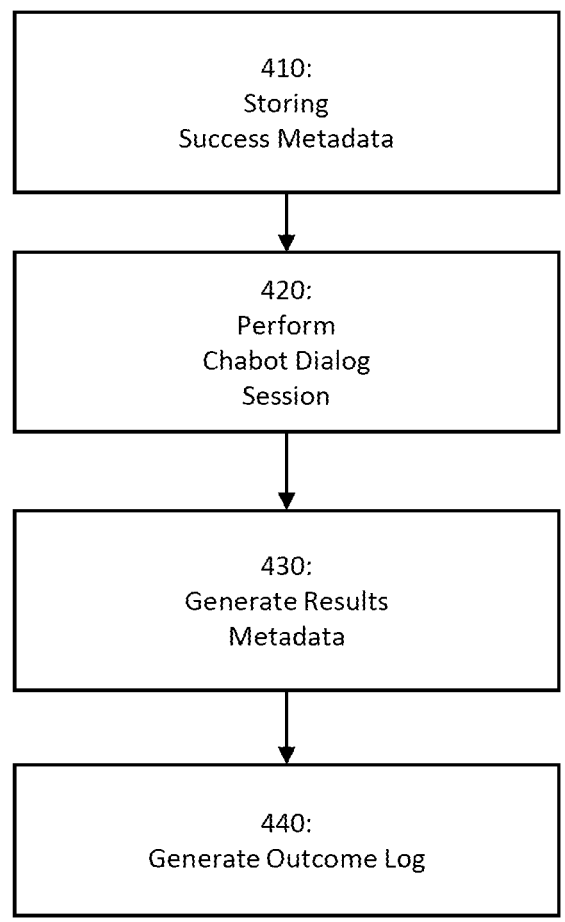
FIG. 4 is a flowchart of a method for generation of signals and measurement of business goals in a chatbot platform according to an exemplary embodiment of the present disclosure.

Turning now to FIG. 4, a flowchart 400 of another method for generation of signals and measurement of business goals in a chatbot platform according to an exemplary embodiment of the present disclosure is shown. The exemplary method may be performed by a processor coupled to a network for receiving data from a plurality of devices and may include devices of different types and categories. The processor can be configured to perform a dialog session algorithm associated with one or more business goals and wherein the one or more business goals are defined by a dialog session administrator and are associated with dialog session responses by the dialog session administrator.

The method may first be configured for storing 410 metadata associating natural language sentence structures with structured data including an outcome data indicative of a positive outcome of the dialog session. The metadata and outcome data may be stored in a memory communicatively coupled to a processor for performing the dialog session algorithm or customer relationship management application.

The method may next perform 420 a chatbot dialog session. In some exemplary embodiments, the chatbot session may be initiated in response to control data received from a user application, such as a web browser, mobile device application or the like. The chatbot dialog session can receive natural language queries from the user application. The natural language query may be generated in response to a natural language user input, such as entering text in a user application text box. The chatbot dialog session next converts the natural language query into a structured database query based on the metadata, performs a search on the stored metadata and other database data using the structured database query on a database and generates a result in response to a response data received in response to the structured database query. The chatbot dialog session next generates a natural language response in response to the result to transmit to the user application.

The method next generates 430 a result metadata in response to a comparison of the result to the outcome data being indicative of the chatbot session achieving a desired business goal. The desired business goal is defined by the chatbot dialog session administrator. In some exemplary embodiments, the result corresponds to a step in a dialog flow of the chatbot dialog session, such as the dialog session reaching a designated step in a dialog flow of the dialog session where the designated step is predetermined by the chatbot session administrator.

In response to the results metadata, the method can generate 440 an outcome log indicative of the positive outcome of the dialog session. The outcome log can include metadata related to a dialog flow of the dialog session, data generated in response to natural language inputs received from the user, and metadata related to a user. In some exemplary embodiments the outcome log may be generated in response to a user confirmation, such as a user responding in the affirmative to a query as to whether the user's question has been answered or to an absence of a subsequent natural language query. A user may disconnect from the Chatbot session once the desired information has been received, so a successful chatbot session may be inferred from the lack of subsequent interaction as well as the administrator predefined goal achieved designation for reaching a chatbot dialog session step. In some exemplary embodiments, an explicit or inferred user confirmation may increase a confidence level of the desired business goal being achieved by the chatbot session. For example, a chatbot administrator may determine that a transmission of a predetermined chatbot response may infer a 90% confidence level of a business goal success, a transmission of a predetermined chatbot response with an inferred user confirmation may infer a 95% confidence level of a business goal success and a transmission of a predetermined chatbot response with an explicit user confirmation may infer a 95% confidence level of a business goal success.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The various tasks performed in connection with the process may be performed by software, hardware, firmware, or any combination thereof. For illustrative purposes, the following description of process may refer to elements mentioned above. In practice, portions of process may be performed by different elements of the described system, e.g., component A, component B, or component C. It should be appreciated that process may include any number of additional or alternative tasks, the tasks shown need not be performed in the illustrated order, and process may be incorporated into a more comprehensive procedure or process having additional functionality not described in detail herein. Moreover, one or more of the tasks shown could be omitted from an embodiment of the process as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A non-transitory computer readable medium having computer instructions stored therein that when executed by a computer system cause the computer system to perform operations comprising:
   storing a metadata associating natural language sentence structures with structured data including an outcome data indicative of a positive outcome of a dialog session, wherein the positive outcome is predefined by a chatbot administrator;
   configuring a chatbot dialog session with access to the structured data;

receiving a natural language query;
converting the natural language query into a structured database query based on the metadata;
performing the structured database query on a database;
generating a result in response to a response data received in response to the structured database query;
generating a natural language response in response to the result;
sending, via a network interface, the natural language response to a user application;
generating a result metadata in response to a comparison of the result to the outcome data being indicative of the result being designated as the positive outcome of the dialog session; and
generating an outcome log in response to the result metadata wherein the outcome log includes an indication of the positive outcome of the dialog session.

2. The non-transitory computer readable medium of claim 1, wherein the result corresponds to a step in a dialog flow of the dialog session.

3. The non-transitory computer readable medium of claim 1, wherein the positive outcome of the dialog session is determined in response to the dialog session reaching a designated step in a dialog flow of the dialog session.

4. The non-transitory computer readable medium of claim 1, wherein the outcome log includes metadata related a dialog flow of the dialog session.

5. The non-transitory computer readable medium of claim 1, wherein the outcome log includes metadata related to a user.

6. The non-transitory computer readable medium of claim 1, wherein the database includes a plurality of natural language responses and wherein the natural language response is selected in response to the response data.

7. The non-transitory computer readable medium of claim 1, wherein the result metadata is generated in response to a user confirmation.

8. The non-transitory computer readable medium of claim 1, wherein the result metadata is generated in response to an absence of a subsequent natural language query.

9. A method for performing a dialog session comprising:
storing a metadata associating natural language sentence structures with structured data, a plurality of natural language response data associated with a dialog session flow and an outcome data indicative of a positive outcome of the dialog session with at least one of a plurality of natural language responses wherein the positive outcome is predefined by a chatbot administrator;
initiating the dialog session;
receiving a natural language query;
converting the natural language query into a structured database query based on the metadata;
performing the structured database query on a database;
generating a result in response to a response data received in response to the structured database query;
generating a natural language response in response to the result and the plurality of natural language response data;
sending the natural language response to a user interface;
generating a result metadata in response to a comparison of the result to the outcome data being indicative of the result being designated as the positive outcome of the dialog session; and
generating an outcome log in response to the result metadata wherein the outcome log includes an indication of the positive outcome of the dialog session.

10. The method of claim 9 wherein the outcome log includes at least one of a subset of the result metadata, a user information and a dialog session performance metric.

11. The method of claim 9 wherein the outcome data is associated with the result by the chatbot administrator.

12. The method of claim 9 wherein the outcome data is associated with the result and wherein the result is one of a plurality of results associated with the dialog session.

13. The method of claim 9 wherein at least one of the plurality of natural language response data is associated to the result by the chatbot administrator.

14. The method of claim 9 wherein the result metadata is generated in response to a user confirmation.

15. The method of claim 9 wherein the result metadata is generated in response to an absence of a subsequent natural language query.

16. The method of claim 9 wherein the dialog session is a chatbot session for performing a natural language dialog between a user application and an host application server.

17. The method of claim 9 wherein the natural language response is one of the plurality of natural language responses associated with the dialog session and wherein the natural language response is stored in a memory communicatively coupled to an application server for performing a dialog session algorithm.

18. A system for performing a dialog session comprising:
a memory configured for storing a plurality of natural language responses associated with a chatbot dialog flow;
an administrator interface configured for receiving a control information associating an outcome data indicative of a positive outcome of the dialog session with at least one of the plurality of natural language responses, wherein the positive outcome is predefined by a chatbot administrator;
a network interface configured for receiving a natural language query, wherein the natural language query is generated in response to a user input in the dialog session and for transmitting a natural language response for display to a user on a user interface; and
a processor configured for generating a structured database query in response to the natural language query, generating a results metadata in response to performing the structured database query, determining the natural language response in response to the results metadata, coupling the natural language response to the network interface, and generating an outcome log in response to the results metadata wherein the outcome log includes an indication of the positive outcome of the dialog session in response to the one of the plurality of natural language responses being associated with the positive outcome of the dialog session.

19. The system of claim 18 wherein the outcome log includes at least one of a subset of the results metadata, a user information and a dialog session performance metric.

* * * * *